United States Patent

Dethloff

[11] Patent Number: 6,000,606
[45] Date of Patent: *Dec. 14, 1999

[54] METHOD AND SYSTEM FOR SECURING AND RESTORING DATA OF A PORTABLE CHIP-CARD IF LOST OR STOLEN

[76] Inventor: Juergen Dethloff, Elbchaussee 177, D-22605 Hamburg, Germany

[*] Notice: This patent is subject to a terminal disclaimer.

[21] Appl. No.: 09/223,145

[22] Filed: Dec. 30, 1998

Related U.S. Application Data

[63] Continuation of application No. 08/773,763, Dec. 24, 1996, Pat. No. 5,902,981.

[30] Foreign Application Priority Data

Jun. 10, 1996 [DE] Germany ............... 196 41 009
Dec. 7, 1996 [DE] Germany ............... 196 28 122

[51] Int. Cl.⁶ .................................................. G06F 17/00
[52] U.S. Cl. ..................... 235/375; 235/380; 235/492
[58] Field of Search ............................ 235/375, 376, 235/380, 382, 382.5, 451, 474, 492; 902/2, 4, 25, 26; 340/825.32, 825.36

[56] References Cited

U.S. PATENT DOCUMENTS

| | | | |
|---|---|---|---|
| 4,630,201 | 12/1986 | White ................................... | 235/379 X |
| 4,837,422 | 6/1989 | Dethloff et al. ........................ | 235/380 |
| 4,839,504 | 6/1989 | Nakano ................................ | 235/379 |
| 4,968,873 | 11/1990 | Dethloff et al. ........................ | 235/380 |
| 5,185,798 | 2/1993 | Hamada ............................... | 235/382 X |
| 5,267,149 | 11/1993 | Anada et al. ......................... | 235/379 X |
| 5,684,291 | 11/1997 | Taskett ................................. | 235/487 |
| 5,902,981 | 5/1999 | Dethloff ................................ | 235/375 |

FOREIGN PATENT DOCUMENTS 9113411  9/1991  WIPO .

OTHER PUBLICATIONS

European Search Report for 97111625.6–2210 (Priority Application), Mar. 1999.

*Primary Examiner*—Michael G Lee
*Attorney, Agent, or Firm*—Notaro & Michalos P.C.

[57] ABSTRACT

Portable data medium with integrated memories is used for various purposes, for example for storing personal medical data or for storing amounts of money. The danger exists that if the data medium is lost or stolen, data or, respectively, amounts of money, are irretrievably lost to the legitimate user. In order to secure these data for the user, it is suggested with the invention to use a small terminal in addition to the data medium, with which the data medium can be connected and wherein subsequently data are copied from the data medium to the terminal. Such terminal is for example necessary in any event for specific types of data media for the operation and for displaying amounts of money. If the data medium is lost, in this case the data can be recovered from the terminal.

9 Claims, 2 Drawing Sheets

6,000,606

METHOD AND SYSTEM FOR SECURING AND RESTORING DATA OF A PORTABLE CHIP-CARD IF LOST OR STOLEN

CROSS-REFERENCE TO RELATED APPLICATION

This is a continuation of application Ser. No. 08/773,763 filed Dec. 24, 1996 and now U.S. Pat. No. 5,902,981.

FIELD AND BACKGROUND OF THE INVENTION

The invention relates to a method for securing data stored in the memory of a portable data medium as well as a system for securing such data.

Portable data media are used for storing various data. Such data media serve, for example, for storing medical data of persons and recently data media have also been used for storing data representing amounts of money or other value units. This last type of data medium is also referred to as an electronic wallet. The data media represent a value corresponding to the amount of money or value units stored therein, which, in the event the data medium is lost or stolen, represents a loss to the rightful owner. It is, on the other hand, conceivable that a deceitful owner changes data on the data medium in order to pretend the availability of greater amounts and thus to defraud the user's bank or the card issuer. It is also possible that with fraudulent claims for damages of supposedly lost data media, a greater amount of money than that still stored in the data media can be claimed. Furthermore, in the case of other types of data media the loss or unauthorized change of data can have unpleasant or even serious consequences.

SUMMARY OF THE INVENTION

The present invention is a method and apparatus with which the data on a data medium can be secured so that it can be restored again, in particular in the event of loss of the data medium or in the event of unauthorized alterations.

The prior art problem is solved by providing a first terminal which can be operatively connected to the data media through contacts or via electric or magnetic fields. The first terminal is in the possession of the rightful owner of the data medium and serves the purpose, for example, of displaying data in the data medium and changing such data in the rightful manner through the corresponding operation of the terminal, for example in order to transfer amounts of money to a cash terminal of a vendor. According to the invention this terminal serves additionally for storing the data contained in the data medium so that, for example in the event the data medium is lost, the data in the terminal are retained. It is assumed that the user normally stores the data medium and the terminal in different locations. The data lost with the data medium can in that case be restored again with the aid of the terminal. The data medium is advantageously in the form of a card.

It is possible that the data in the data medium have been altered for example through an error function or a disturbance or also fraudulently without use of the first terminal and for that reason no longer agree with the data stored in the terminal. In order to be able to recognize this event, according to an embodiment of the invention, it is useful that the data in the data medium to be changed are first transferred to the terminal and compared with the data stored therein before any change is carried out. Only if their identity has been determined, can the data medium be accessed for the purpose of changing data. In the event these data are not identical, an error signal is output and further functions are blocked.

Further security against error functions or fraudulent manipulations is possible according to a further embodiment of the invention in that the data stored in the terminal are changed in the same way as in the data medium and the changed data are compared with the changed data transferred from the data medium before these changed data are stored in the terminal. This ensures that the data medium as well as the terminal, operate properly. In the event the data differ an error is indicated, as described before, and all further functions are blocked.

However, an exception from the requirement that the data stored in the data medium and in the terminal must agree, exists if the data in the data medium have been legitimately changed through another terminal. It is understood that this is only possible after a prior mutual authenticity check. So that in a subsequent connection of the data medium with the first terminal no error is indicated, when such a change of data through another terminal happens, the data medium is set so that during the subsequent connection with the first terminal, the data medium transmits a single control signal which causes the terminal to store the data transmitted immediately, after the connection from the data medium to the terminal, without a check. In the case of the electronic wallet, the authorized change of data in the data medium takes place if a new or an additional amount of money is stored in the data medium.

The method according to the invention described above is especially useful if the data medium is used as an electronic wallet and is structured such that it comprises a memory having a first and at least one second memory section. To the first memory section amounts of money can only be transferred through external access, while money which is to be transferred for the purpose of paying into the terminal of a vendor, must first be transferred from the first memory section into a second memory section. This takes place with the aid of the first terminal which is thus necessary for this purpose even if for no other reason.

The first terminal can be implemented in different ways, but it always comprises an energy source. In one implementation it represents a small pocket device which can even be significantly smaller than the data medium itself, specifically only large enough so that it can be connected with the connection elements of the data medium, such as, for example, contacts or coil. Such a terminal can be implemented for example as a keying attachment. The first terminal can also be implemented as an electronic notepad or pocket computer or be contained in such a device or into a so-called "personal organizer". It can further also be integrated into a personal computer, in particular into a portable PC. It is also possible for it to be included in a mobile telephone. All of the devices listed here as examples comprise a keypad and a display element which can also be used for the purposes of the first terminal.

All devices which have the capability of connecting to a data network or a telephone network, such as a computer with modem or mobile telephone, can also be used for the purpose of carrying out other legitimate changes in the data medium, for example downloading, uploading or reloading amounts of money or other value units.

In general, legitimate changes can be carried out from the first terminal in embodiments of devices which, for example by means of a telephone or data network, can be connected to devices which are authorized to output and transfer commands for data changes in the data medium such as downloading or uploading processes. Such device can be, for example, the computer of the user's bank or a similar device of a vendor of goods or services.

But all implementations of the first terminal presuppose that between the data medium and the first terminal a unique assignment must exist, which can be checked, namely through secret data stored in the data medium and in the terminal, so that it is not possible to change data in the data medium through a non-authorized terminal or to transfer data from the data medium into a non-authorized terminal.

The invention relates further to a system for securing data with a portable data medium and a terminal cooperating therewith, as well as a terminal and a data medium for such system.

BRIEF DESCRIPTION OF THE DRAWINGS

Examples of the invention will be described in further detail in the following with reference the drawing, wherein.

DESCRIPTION OF THE PREFERRED EMBODIMENTS

Figure 1:
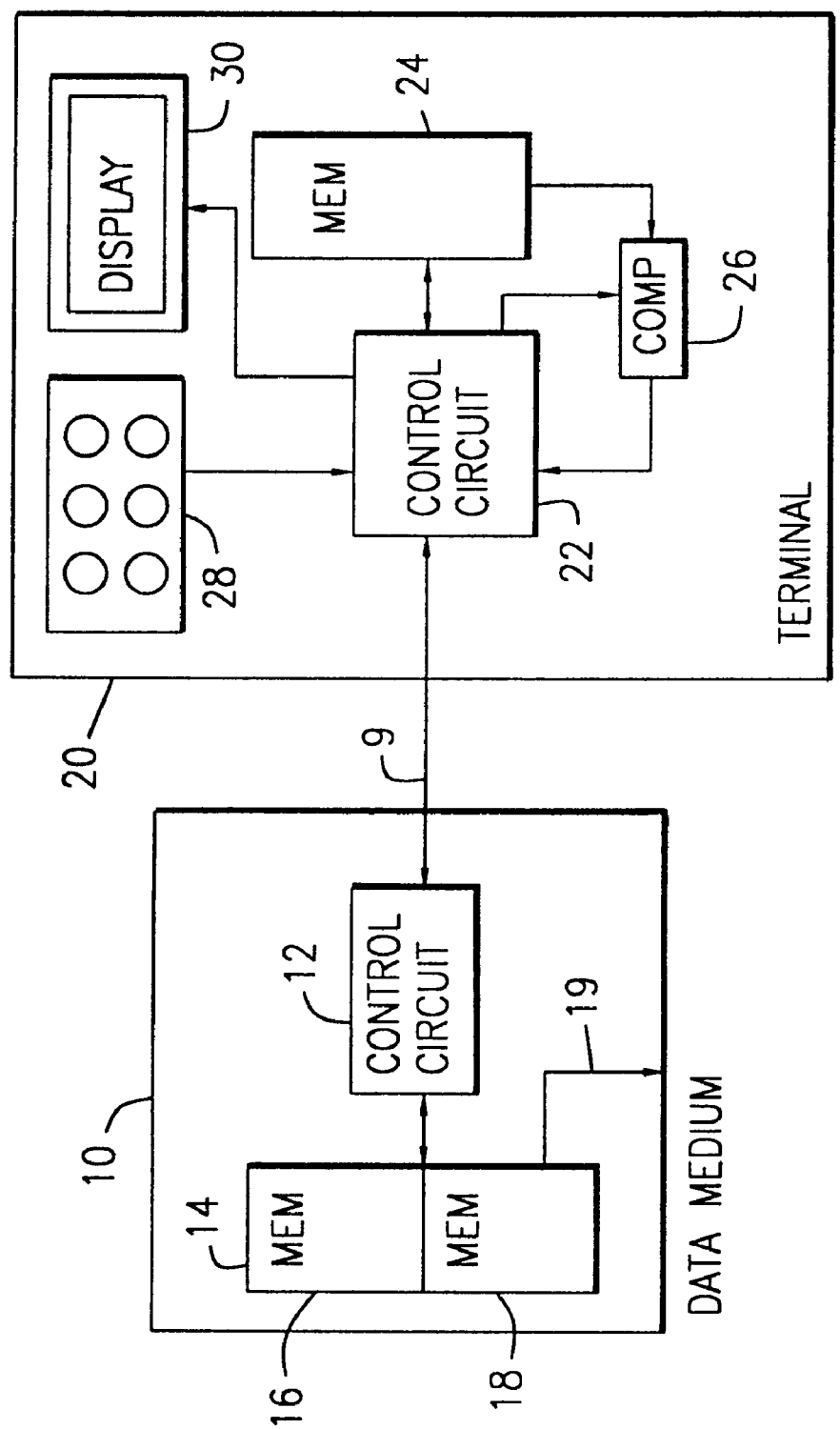
FIG. 1 is a schematic block circuit diagram of a system with a data medium and a terminal of the invention.

In FIG. 1 a data medium 10, such as a chip-card, comprises a control circuit 12 as well as a memory 14 comprising in this case two sections 16 and 18. The memory is preferably a semiconductor memory. This data medium 10 is operatively connected to a terminal 20, as indicated by a connection 9. This connection can be realized through contacts (not shown here) or also without contacts via electromagnetic (ac) fields. The terminal 20 comprises a control circuit 22 as well as a memory 24 and a comparator 26. Further, a number of buttons 28 and a display element 30 are provided in terminal 20. The control circuit 22 controls the writing and reading of data into and from the memory 24. According to their actuation by the user, the buttons 28 output signals to the control circuit 22, while the display element 30 receives information from the control circuit 22 and displays it. The comparator 26 receives data to be compared from the control circuit 22 and the memory 24 and supplies the result of the comparison to the control circuit 22. The control circuits 12 and 22 are usefully realized through microprocessors integrated on a semiconductor element, in particular together with memory 14 or, respectively, memory 24. Memories 14 and 24 must be non-volatile memories which retain their content even without an operating voltage. They must thus be implemented in particular as EEPROMs.

In the data medium 10, which in this example is to represent an electronic wallet, the control circuit 12 controls the writing and reading of data into and from memory 14, here representing amounts of money. However, in the following description the more general term "data" will be used. Into memory section 16 practically only data are written which represent the total available amount of money. Following the corresponding actuation of the buttons 28, from terminal 20 control signals and data signals are transmitted over the connection 9 to the control circuit 12 in the data medium 10, which cause the control circuit 12 to transfer a partial amount from memory section 16 to section 18, so that in sections 16 and 18, data are changed accordingly. Amounts of money can only be transferred from section 18 over connection 19 to the outside if the data medium is subsequently connected to a terminal (not shown), for example of a vendor, with data in section 18 being changed or erased correspondingly. Section 16 cannot be accessed in this process so that money contained therein cannot be transferred directly to the outside.

In order to transfer money in the data medium 10 from section 16 to 18 only by the authorized owner and thus to make it available to the user, it is necessary to ensure that this transfer is only possible through that terminal 20 which is also in the possession of the legitimate user. For this purpose, after a connection of the data medium 10 with terminal 20 is established, first, in known manner, an authorization check is carried out by means of secret data which are stored in data medium 10 and in terminal 20 before a change of data in the data medium and in the terminal is allowed. This check is performed automatically.

A further check is subsequently carried out, which will be explained in greater detail in conjunction with the flow chart in FIG. 2. The starting point 52 indicates the termination of the preceding authorization check and the start of the further check. Block 54 indicates that the data are read out from section 16 of memory 14 in data medium 10 and are transferred over connection 9 to terminal 20. There, the control circuit 22 supplies these transferred data to the comparator and simultaneously reads data from memory 24, which are also supplied to comparator 26. These data read from memory 24 are intended to be a copy of the data stored in section 16 of the data medium 10, so that in the normal case the comparator 26 indicates to the control circuit 22 the identity of both supplied data. This comparison is indicated in the flow chart with block 56. However, if the comparison of the data shows their nonidentity, according to block 72 an error signal is triggered on the display element and subsequently the check is terminated and no further functions in the system comprising data medium 10 and terminal 20 can be executed.

If the comparison of the data has indicated their identity, the procedure continues to block 58, wherein an amount of money, which the user has entered for example via the buttons 28, is to be transferred in the data medium 10 from section 16 to section 18. This entry causes the control circuit 22 to transmit control signals and data signals to control circuit 12 in the data medium 10, whereby the control circuit 12 subtracts a value, corresponding to the entered amount of money, from the data in section 16 and adds it to the data in section 18. This step is indicated by block 60 in FIG. 2. The changed data, which after the subtraction are stored in section 16, are transferred to terminal 20, as indicated by block 62.

In terminal 20 the control circuit 22 has also subtracted from the data in memory 24 the value corresponding to the entered amount of money and supplied the result to the comparator 26, as indicated by block 64. The changed data transferred from data medium 10 are now also supplied to the comparator 26. If the described operations have been correctly executed in the data medium 10 and terminal 20, the comparator 26 again indicates the identity of the data to the control circuit 22. Thereupon, via the control circuit 22, the writing of the changed data into memory 24 is triggered, as indicated in block 68. Therewith the memory 24 contains again the same data as section 16 of the memory 14 in data medium 10 so that in the error-free case terminal 20 always contains the same data, i.e. the same available amount of money, as data medium 10. If the data medium is lost or stolen or if the data in the data medium are changed through external action, it is possible to determine at any time in conjunction with the terminal the last available valid amount of money. For this purpose it must be possible to read the content of memory 24, preferably via the display element 30. In the event the data medium is lost, the last valid amount of money can be written into a new data medium by the user's bank or the issuer of the data medium so that the legitimate user of the data medium suffers virtually no damage. A person finding a data medium or a thief cannot use it improperly since it is only possible to dispose of the money stored in the data medium with the aid of the correct terminal. In this event the user's bank also does not suffer any damage.

However, it is also possible that a legitimate user with fraudulent intent informs his bank that he has lost the data medium or that it was stolen and that a relatively large amount of money was still stored in it even though this is actually not the case. The fraudulent user would then receive from his bank a new data medium with the amount of money indicated on the terminal so that the user could spend this amount of money twice, namely separately with both data media. In order to prevent this, the secret data for the authorization check could be stored when the bank issues both elements, where by bank is to be understood the issuer of the data medium, in the following way.

When a new data medium is connected for the first time with a terminal, the data medium outputs secret data to the terminal. These secret data are generated in the data medium, for example through a random generator, and are subsequently stored in the data medium, or they are already stored in the data medium, for example during the fabrication, or they are written in by the bank. The terminal receives these secret data and, after potentially processing them first, stores them. In addition, the terminal can also output further secret data which can be derived, for example, from the received data and which are stored in the data medium, potentially after a preceding processing. But this must only be possible once and must at least be blocked in the data medium against repetition. Otherwise the security against fraud would be endangered in the event the data medium is lost or stolen, Through a first connection of terminal and data medium thus an exclusive assignment is established, i.e. the terminal can subsequently not cooperate with any other data medium nor is the converse possible. With every connection of the data medium with the terminal the terminal transfers secret and/or random data to the data medium which checks them against stored secret data. If this check is successful, the data medium potentially transfers further secret data to the terminal, and the changing of data in memory 14 can be allowed. Before the enabling of the change, instead, a check of the assignment can be performed by means of a so-called challenge-response process based on the secret numbers with random data.

The sole exception to this is given if, with suitable security measures, after the loss of one of the two parts, a legitimate replacement with authorization by the issuer is assigned exclusively to the still available other part so that an exclusive match is generated again. The assignment of a terminal to a user should be recorded by the issuer in order to prevent fraud in the event a fraudulent user asserts falsely that his terminal has been lost.

Figure 2:
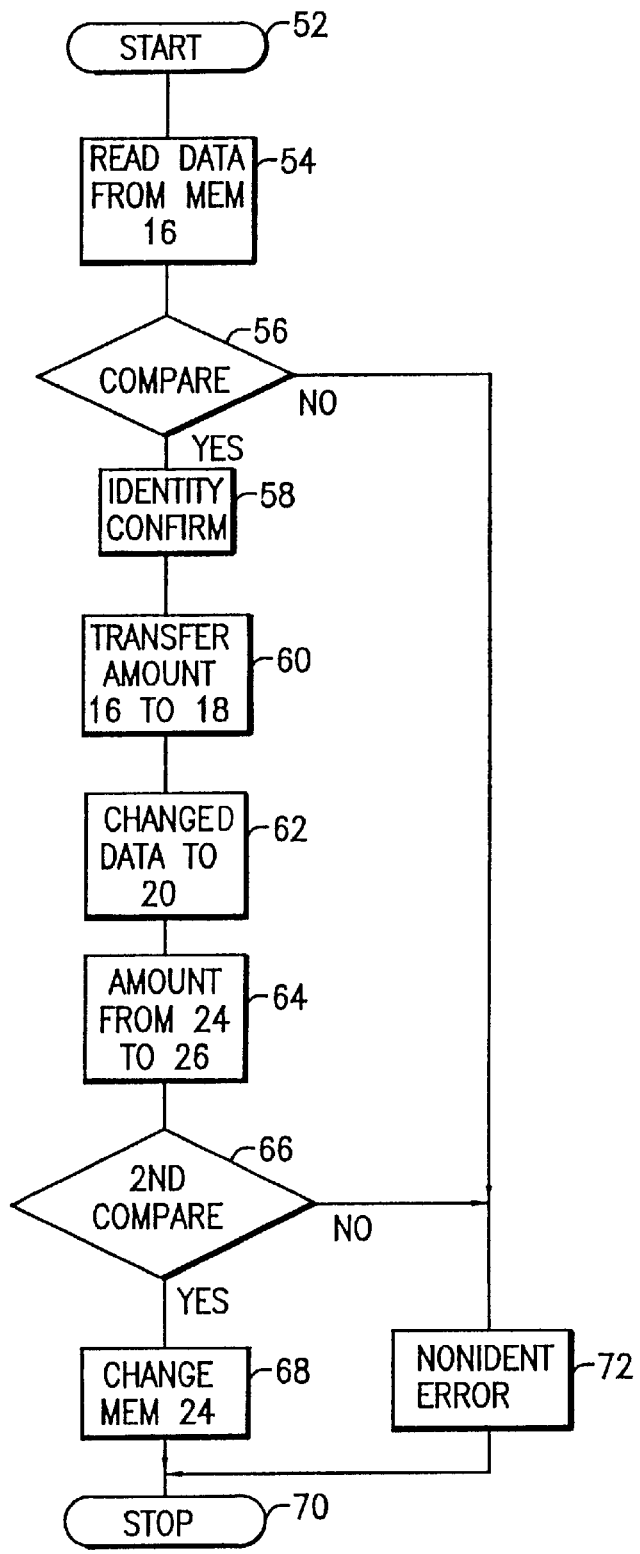
FIG. 2 inflow chart representing the sequence of functions in this system.

In the procedure according to the flow chart in FIG. 2 many steps serve only for security against error function or fraud and can, in principle, be partially or entirely omitted. The essential steps which absolutely must be carried out in order to obtain in terminal 20 a permanent copy of the data in memory section 16 in the data medium 10, which indicate the rightfully available amount of money, are steps 58 to 62 and 68 in FIG. 2.

An exception from the requirement that in terminal 20 a copy of the data of the data medium must always be stored, is given if into the data medium an amount of money is transferred, for example by the users bank, which amount is added to the available amount of money and which represents the total money available for spending. Uploading takes place with a suitable terminal, wherein an authorization check is performed which differs from the corresponding check carried out when connecting the data medium 10 with the terminal 20. By transferring the uploaded amount of money into the data medium, the data in memory section 16 in the data medium 10 differ from the data stored in terminal 20. So that no error is signalled in this case, when the data medium 10 is subsequently connected with the terminal 20, the control circuit 12 in data medium 10 when transferring the additional amount of money, is set so that it subsequently during the succeeding first-time connection with terminal 20 transmits once a control signal to the terminal whereby the latter suppresses the check for data identity when, before the change of the data in the data medium, the content of the memory section 16 is transferred to the terminal. Instead, this transferred content is written into memory 24 of the terminal, and the further procedure is subsequently executed as shown beginning with block 58 in FIG. 2. Usefully, the effectiveness of this control signal is a function of a positive result of a check for exclusive association of data medium and terminal.

While a specific embodiment of the invention has been shown and described in detail to illustrate the application of the principles of the invention, it will be understood that the invention may be embodied otherwise without departing from such principles.

What is claimed is:

1. A terminal for securing data stored in a memory of a portable data medium, comprising:
   a control circuit operatively connectable to a data medium;
   a memory controlled by the control circuit for storing data;
   at least one button for providing signals to the control circuit when the button is actuated; and
   means for automatically performing an authorization check, after the data medium is operatively connected to the terminal, by means of secret data stored in the terminal and in the data medium which individually and uniquely assign said terminal only to said data medium so that said terminal may change data only in said data medium, the control circuit being adapted to transmit control signals and data signals for changing data in the data medium following a corresponding actuation of the at least one button and to store changed data received thereafter from the data medium only after a successful authorization check.

2. A terminal as stated in claim 1, further comprising a comparator connected with the control circuit and to the memory and adapted to compare, prior to the transmission of control signals and data signals to the data medium, data read from the memory with data transferred from the data medium and to supply the result of the comparison to the control circuit, the control circuit further being adapted to release the transmission of control signals and data signals to the data medium only in case of a predetermined result of the comparison.

3. A terminal as stated in claim 2 which stores, after receiving a control signal from the data medium, subsequent transmitted data immediately without comparison with data from the memory.

4. A terminal as stated in claim 2, wherein the control circuit is further adapted to perform the change of data according to the control signals and data signals transmitted to the data medium and to compare, by means of the comparator, the changed data with the changed data transferred from the data medium and to store the changed data only after a successful comparison.

5. A terminal as stated in claim 1, adapted to receive, only after a first connection of a data medium with the terminal, secret data from a data medium and to store these secret data automatically.

6. A terminal as stated in claim 5, wherein the secret data are stored after processing them.

7. A terminal as stated in claim 5 including means which transfers, after receiving of the secret data from the data medium, further secret data to the data medium.

8. A terminal as stated in claim 1, wherein the terminal is selected from the group consisting of an electronic notepad, a pocket computer, a personal organizer and a mobile telephone.

9. A terminal for securing data stored in a memory of a portable data medium, comprising:

a control circuit operatively connectable with a data medium;

a memory controlled by the control circuit for storing data;

display elements;

buttons for providing signals to the control circuit when at least one of said buttons is actuated; and means for performing automatically an authorization check, after the data medium is operatively connected to the terminal, by means of secret data stored in the terminal and in the data medium, which individually and uniquely assign said terminal only to said data medium so that said terminal may change data only in said data medium, the control circuit being adapted to transmit control signals and data signals for changing data in the data medium following a corresponding actuation of the at least one button and to store changed data received thereafter from the data medium only after a successful authorization check.

* * * * *